Aug. 13, 1957     R. D. BUDD     2,802,653
TUNNELING MACHINE HAVING ROTATING CUTTING BARS
Filed Sept. 16, 1954     4 Sheets-Sheet 2
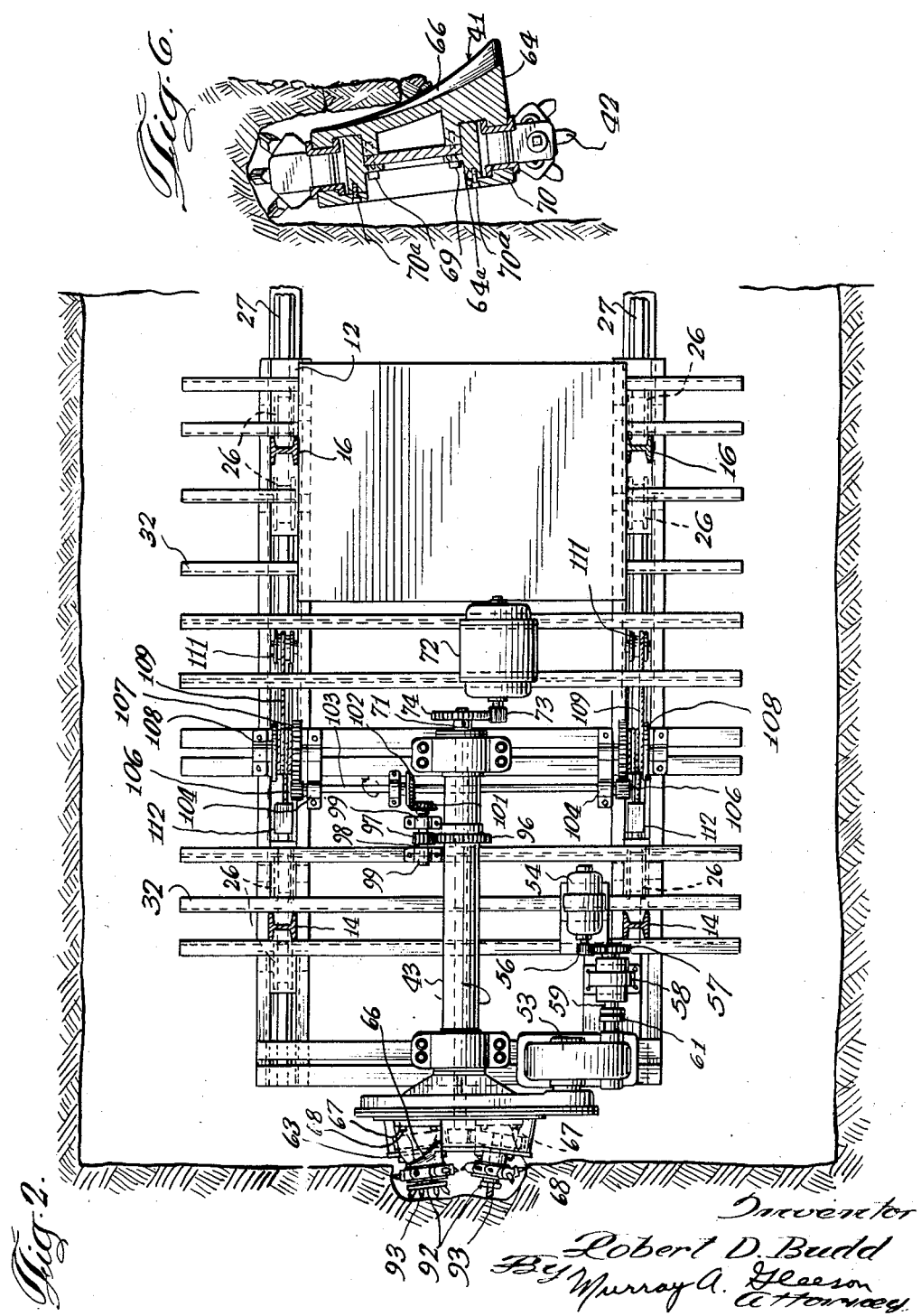

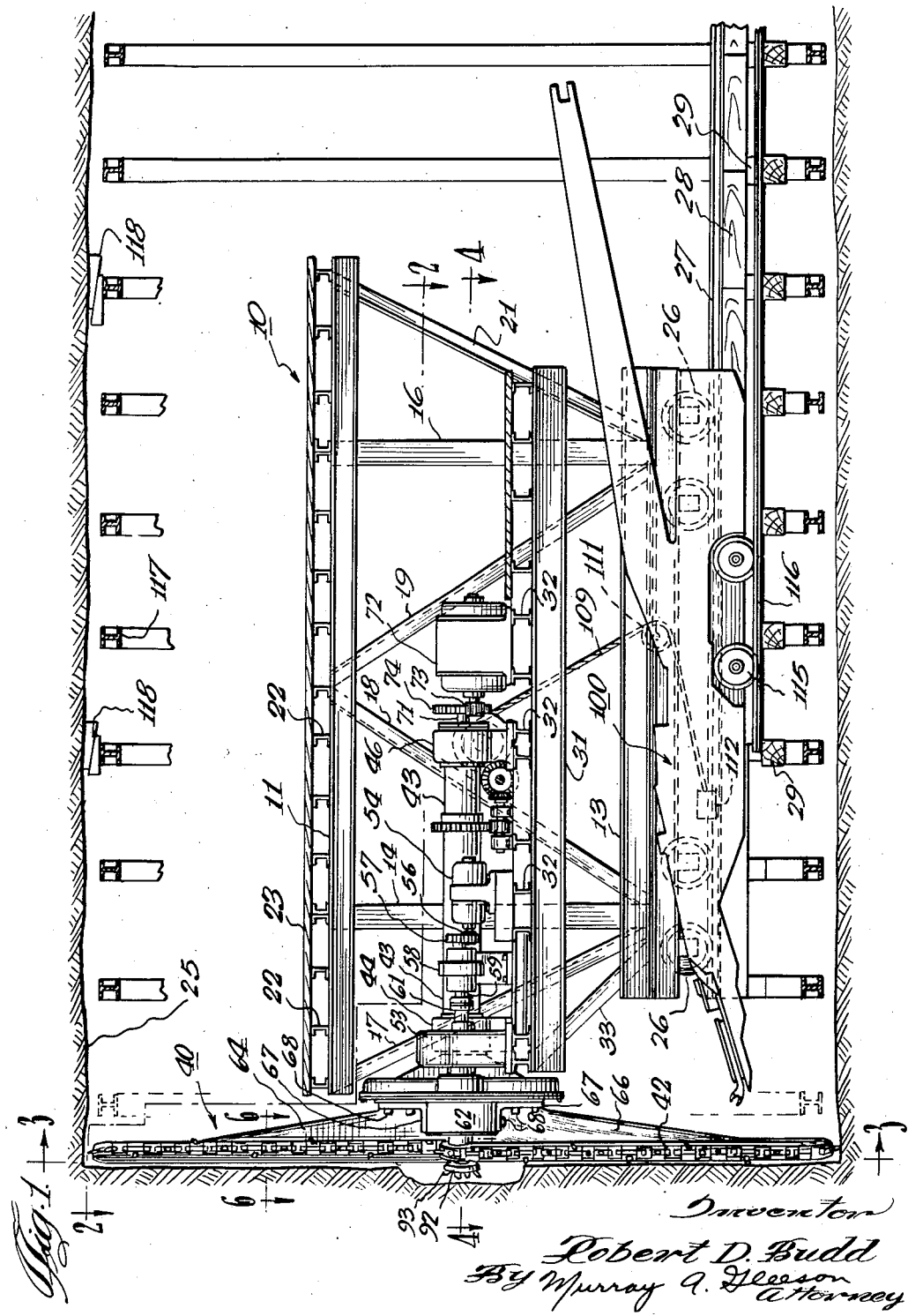

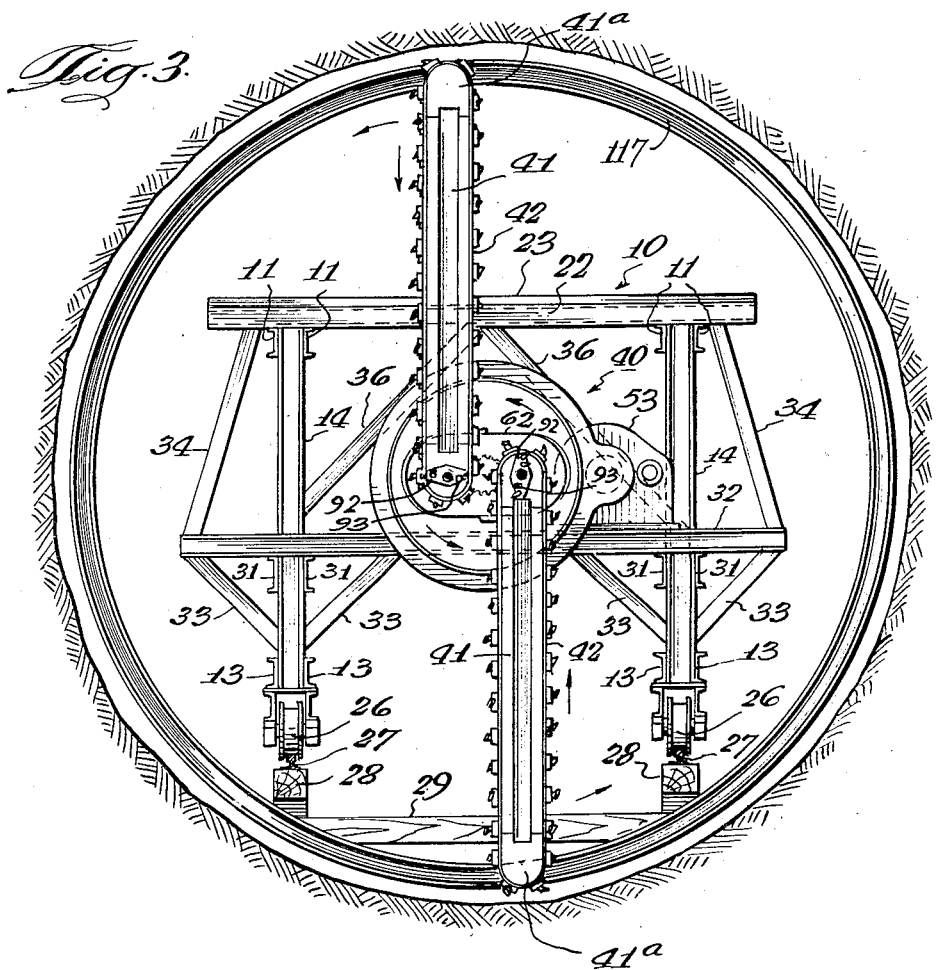
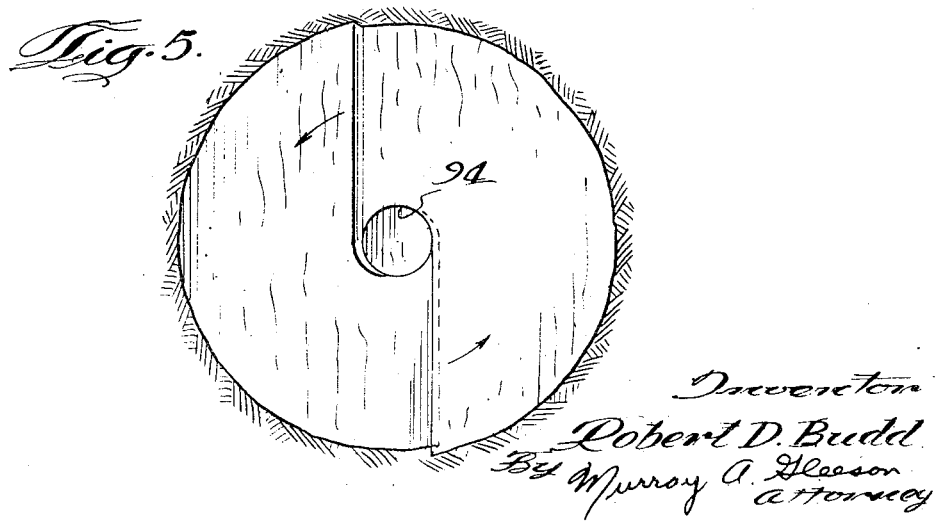

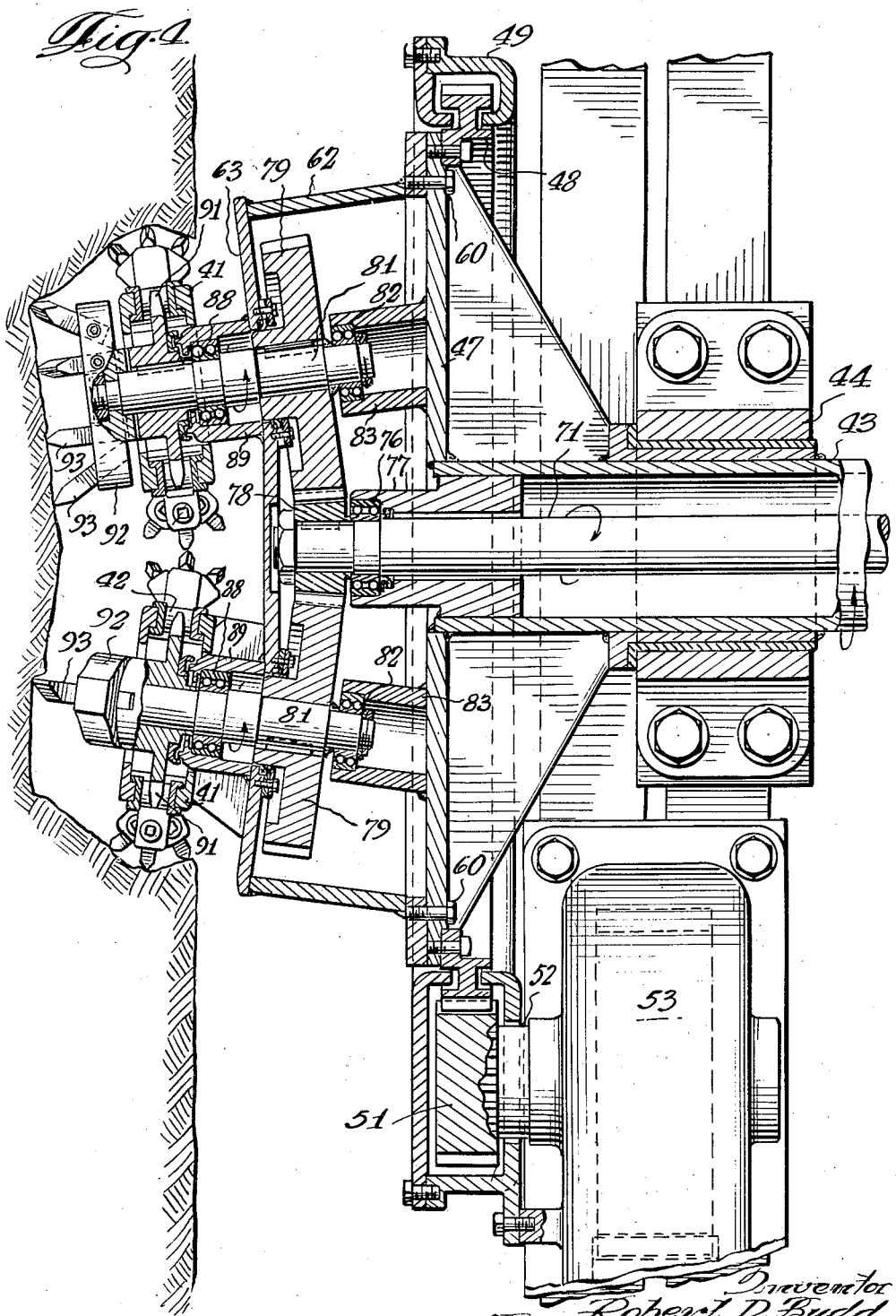

United States Patent Office 2,802,653
Patented Aug. 13, 1957

2,802,653

TUNNELING MACHINE HAVING ROTATING CUTTING BARS

Robert D. Budd, La Grange Park, Ill., assignor to Goodman Manufacturing Company, Chicago, Ill., a corporation of Illinois Application September 16, 1954, Serial No. 456,467

13 Claims. (Cl. 262—7)

This invention relates generally to a machine for mining or the like, and relates more particularly to an improved machine for driving tunnels in appropriate rock or other solid material without the need for blasting.

The tunneling machine according to the present invention is characterized by a boring or cutting head rotating on an axis corresponding to the axis of the tunnel, and consisting of one or more cutter bars inclined at an angle to the face to be cut, so that as the boring progresses the cutter bars can follow a helical path, the pitch of the helix being predetermined by fixing the speed of rotation of the cutter head and the rate of advance of the machine along the axis of the tunnel. The cutter bars are equipped with power-driven cutting edges so as to cut with a minimum of feed pressure in the manner of a saw. The entire boring head with its drive motors, gearing and propelling mechanism is mounted on a suitable frame which may be arranged to move upon rails or upon crawler treads or rubber tires.

In a preferred form of the invention, two such cutter bars extend in opposite directions from a point near their turning center, and the cutter elements of each are arranged to be driven by a central bevel pinion cooperating with meshing bevel gears which enable each cutter bar to have the desired pitch angle. The rotatable mounting for the cutter bars is arranged to turn on a quill shaft which may preferably be driven through a speed reducing train and an auxiliary motor.

One of the principal objects of this invention is to provide an improved tunneling machine characterized by continuously rotating boring arms and orbitally movable cutter elements thereon, so arranged as to present a proper cutting angle to advance the arms into the face to be cut, the action of the boring arms being such as to cut an essentially helical path.

Other objects and important features of the invention will be apparent from the specification following taken with the drawings which together show a preferred embodiment of the invention and what is now considered to be the best mode of practicing the principles thereof. Other embodiments of the invention may be suggested to those having the benefit of the teachings herein, and it is therefore intended that the scope of the invention not be limited by the precise embodiment herein shown, such other embodiments being intended to be reserved, particularly as they fall within the scope and purview of the claims subjoined.

In the drawings:

Fig. 1 is a side view of a tunneling machine according to the present invention;

Fig. 2 is a plan view thereof, looking particularly along the line 2—2 of Fig. 1, and in the direction of the arrows;

Fig. 3 is a front view of the boring head of the machine shown in Fig. 1, said view being taken along the line 3—3 of Fig. 1 and looking in the direction of the arrows.

Fig. 4 is an enlarged horizontal sectional view taken along the line 4—4 of Fig. 1 and looking in the direction of the arrows;

Fig. 5 is a reduced in scale, vertical view substantially like Fig. 3, showing the action of the boring arms in cutting a bore in the seam shown in Fig. 1; and Fig. 6 is a transverse sectional view through one of the boring arms of the boring head shown in Fig. 1, said view being taken along the line 6—6 of Fig. 1 and looking in the direction of the arrows.

Referring now particularly to the drawings, the improved tunneling machine according to the present invention includes a supporting framework referred to generally by the reference numeral 10. The framework 10 includes horizontally spaced upper frame members 11 and spaced lower horizontally extending frame members 13 which are arranged to form upper and lower chord members of a framed truss including vertical strut members 14 and 16 connecting diagonally extending struts 17, 18, 19 and 21. The upper chord members 11 are spanned by channel members 22 spaced throughout the length thereof. These channel members 22 afford a support for planking 23 protecting both the workmen and the apparatus from rock or other material falling from the roof of a bore 25 formed by operation of the apparatus according to the present invention, as will appear in more detail as this specification proceeds.

The lower chord members have depending therefrom spaced trucks 26, 26 which are arranged to ride upon rails 27 supported upon stringers 28 resting upon tie members 29. The tie members 29 are arranged to be supported in the invert of the bore 25 as the tunneling thereof proceeds.

The framework thus far described is arranged to support a boring mechanism for forming the tunnel bore 25, and indicated generally by the reference numeral 40, as will be described in more detail as this specification proceeds. Such a support for the boring mechanism 40 includes spaced channel members 31 which are welded to the vertical supports 14 and 16. The members 31 support transversely extending channel members 32, affording a support platform for boring mechanism 40.

The platform comprising the channel members 32 is braced against swaying by members 33 which frame from the channel members 32 in opposite directions and down toward the lower chord members 13, and by inclined bracing members 34 which extend from the channel members 32 to the upper transverse channel members 22. The structure may also be braced by inclined members 36 which extend from the midpoint of the upper transverse channel members 22 outward and downward to the vertical supports 14 and 16.

The boring mechanism 40 consists of oppositely extending cutter bars 41 having orbitally movable cutter chains 42 on each. As seen in Fig. 3, the cutter arms 41 extend in opposite diametrical directions and are arranged to rotate with a central quill shaft 43 mounted in spaced bearings 44 and 46. As seen in Fig. 4, the quill shaft 43 turns with an annular housing plate 47 having a ring gear 48 mounted at the outer periphery thereof. The ring gear 48 turns within an annular housing 49, and is driven by a pinion 51 mounted on an output shaft 52 from a speed reducer 53, see also Fig. 2. The speed reducer 53 is driven through the medium of a motor 54 driving a pinion 56 and a spur gear 57 connected to a planetary reduction train 58. An output shaft 59 from the planetary reduction train 58 is connected through a flexible coupling 61 to the speed reducer 53.

For purposes of illustration herein the motor 54 is connected through the planetary reduction train 58, the speed reducer 53, and gear 48 and pinion 51, to turn the cutter bars 41, 41 at a speed of approximately two revolutions per hour. While such a figure may be indicated as desirable, other speeds for the rotating boring arms 41 may be indicated without departing from the spirit of the invention.

As seen with reference to Figs. 3 and 4, the plate 47 has fastened thereto by means of cap screws 60 a generally elliptical-shaped housing 62 which is closed by a closure plate 63 welded thereto.

The housing 62 affords a means of supporting the cutter bars 41. As seen also with reference to Fig. 6, each of the cutter bars 41 includes a longitudinally-extending supporting member 64 therefor. The supporting member 64 has an arcuate surface 66 which wedges off the overlying rock, and the member 64 has an increasing taper from the end of the cutter bar 41 remote from its turning center upon the quill shaft 43 to the housing 62. Each of the cutter bars is connected at the housing closure plate 63 by means of a connecting flange 67 which is held thereto by means of cap screws 68.

It will thus be seen that as the quill shaft 43 rotates together with the housing 62, that the two diametrically extending cutter bars 41 will rotate therewith.

As seen in Fig. 6, the supporting member 64 of the cutter bar frame 41 has held thereto a subframe 64a by means of cap screws 69. The endless cutter chain 42 is guided around the subframe 64a and is held in its orbital path by means of a plate 70 held to the subframe 64a by cap screws 70a. Each cutter bar assembly 41 has an end shoe 41a around which the cutter chain is reversed in direction. End shoe 41a is bolted or otherwise secured to the cutter bar frame 41 in such a fashion that it can be removed therefrom for retraction of the boring mechanism 40 when desired.

Referring now to Figs. 2 and 4 particularly, means are provided for affording orbital movement to the endless cutter chain 42 upon each cutter bar 41. To this end the quill shaft 43 encloses a main driving shaft 71 which is driven by a motor 72. A driving pinion 73 of the motor 72 drives a spur gear 74 mounted at the end of the main drive shaft 71. As seen also in Fig. 4, the drive shaft 71 is supported in a bearing 76 held in a hub 77 which turns with the quill shaft 43.

A central bevel driving pinion 78 is mounted to the end of the main drive shaft 71 within the housing 62. This central tapered driving pinion meshes with bevel gears 79, 79, each such bevel gear being mounted fast to a stub shaft 81 which is held at one end in a bearing 82 supported upon a bearing support 83 extending from the anular housing plate 47.

Each of the stub shafts 81 is supported also in a bearing 88 supported in turn in a flange 89 extending from the closure plate 63. A drive sprocket 91 is secured to each of the stub shafts 81, and the drive sprocket 91 drives the cutter chain 42.

It will thus be seen that the bevel gear train comprising the bevel driving pinion 78 and the mating bevel gears 79 will provide a proper pitch angle to each one of the cutter bars 41, so that the arms can be advanced into the face, as seen in Fig. 5, to cut the rock much in the fashion of an auger.

Means are provided for affording clearance to each of the cutter bars 41 adjacent the inner ends thereof. To this end the stub shafts 81 have fast thereto a plate 92 supporting cutter bits 93. These cutter bits 93 thus describe a circle in rotation about stub shafts 81, and in rotation with the cutter bars 41 with the quill shaft 43 a central clearance area 94 as seen in Fig. 5.

Means are provided for forcing the framework together with the boring mechanism along the rails 27 in accordance with the rotation of the quill shaft 43. To this end, see also Fig. 2, the quill shaft 43 has fast thereto a spur gear 96, meshing with a pinion 97 supported upon a shaft 98 held in spaced bearing supports 99, 99 mounted on the cross members 32. Shaft 98 has a bevel pinion 101 mounted thereon which meshes with a bevel gear 102 fast upon a shaft 103. The shaft 103 is supported near each end in a bearing 104 and the end thereof is fitted with a driving pinion 106 meshing with a spur gear 107 turning with a winch drum 108. A flexible strand 109 is wrapped about the winch drum 108 and is trained about an idler sheave 111 secured to the lower chord member 13 of the framework 10. The flexible strand 109 is anchored to a fixed abutment 112 disposed on the spaced rolls 27. It will thus be seen that as the quill shaft 43 turns, the drum 108 of the winch will wind in the flexible strand 109 so as to cause the mechanism to be forced against the face.

As the framework 10 and the boring head 40 advance into the face, the action of the cutter chains 42 is such as to cut the face much in the fashion of an auger. The cuttings from the action of the endless cutter chains 42 will drop to the invert of the bore 25.

Means are provided for removing the cuttings resulting from action of the boring arms 41, 41 and the endless cutter chains 42, and to this end the rails 27 are spaced a sufficient distance apart to permit the operation between and below the frame structure 10 and between the chord members 13, 13 of a wheel mounted material gathering and loading machine indicated generally by the reference numeral 100. The precise construction of such a material gathering and loading machine forms no part of the present invention, and is not described in detail. Such a machine has wheels 115 arranged to ride on spaced rails 116 supported upon the cross members 29 and is arranged to advance with the framework 10.

The present apparatus is particularly adapted to the driving of tunnels of circular cross section. These tunnels may require support by means of circular support beams 117, as indicated in Figs. 1 and 3 of the drawings. These are composed of circular segments which are wedged in place against the roof, sides and invert of the tunnel by wedging members 118, the support beams 117 thereafter being enclosed in concrete. In the conception of the machine herein, it is contemplated that such beams may be required, and it is the purpose of this design to permit the installing of such supports at a point close to the face so as to support the roof and side walls of the tunnel.

The structure according to the present invention presents a number of advantages, the principal one being that all of the operations take place in a continuous manner and without the need of blasting. The cutter elements mounted upon the cutter chain 42 are arranged to rip the rock from the face, while the contour of the support member 65 of the cutter frames 41 wedges off the material remaining behind from the action of the cutter elements, as seen more particularly in Fig. 6. The rate of rotative advance of each of the cutter arms 41 is had by action of the auxiliary motor 54 which need be only very small in power output as compared to the main driving motor 72 for causing orbital movement of the cutter chain about the cutter frames.

While the invention has been described in terms of a preferred embodiment thereof, the scope is intended to be limited only by the terms of the claims here appended.

I claim as my invention:

1. In a machine for cutting an essentially circular bore in rock or other material, a movable supporting frame, a boring mechanism carried by the supporting frame, said mechanism including a rotating means rotatable about an axis corresponding to the longitudinal axis of the bore, a pair of cutter bar assemblies each having orbitally movable cutter elements thereon, each of said cutter bar assemblies being secured to said rotating means for rotation therewith about said axis, said cutter bar assemblies extending in opposite directions from portions of said rotating means which are radially offset from the axis of rotation, said cutter bar assemblies each being tilted in relation to the axis of rotation and disposed substantially parallel to a tangent to the rotating means with the inner ends of the cutter bar assemblies terminating in overlapped relation, and drive means for rotating said rotating means and cutter bar assemblies about said axis and for orbitally driving said cutter elements about said cutter bar assemblies while crowding the cutter bar assemblies and supporting frame longitudinally of the bore.

2. The structure defined in claim 1 wherein said drive means includes a first means for rotating said rotating means and cutter bar assemblies and a second means for orbitally driving said cutter elements about said cutter bar assemblies independently of the rotation thereof while crowding the cutter bar assemblies and supporting frame longitudinally of the bore.

3. The structure defined in claim 2 wherein said second means includes a winch on said supporting frame and a flexible strand anchored to a fixed point and wound upon the winch.

4. The structure defined in claim 1 wherein said rotating means includes a quill shaft mounted on said supporting frames and a housing secured to said quill shaft for rotation therewith with said portions from which said cutter bar assemblies extend being on said housing.

5. The structure defined in claim 4 wherein said drive means includes a driving shaft extending within said quill shaft and said housing.

6. The structure defined in claim 4 wherein said drive means includes means driven from said quill shaft for crowding the cutter bar assemblies and supporting frame longitudinally of the bore.

7. The structure defined in claim 4 wherein said drive means includes a driving shaft extending within said quill shaft and said housing, a driven means drivably connected to said driving shaft and including means mounted thereon for driving the respective orbitally movable cutter elements.

8. The structure defined in claim 7 together with a rotatable cutter mounted on said driven means for cutting clearance for said cutter bar assemblies at the overlapped inner ends thereof.

9. In a machine for cutting an essentially circular bore in rock or other material, a movable supporting frame, a boring mechanism carried by the supporting frame, said mechanism including a rotating head rotatable about an axis corresponding to the longitudinal axis of the bore, a pair of cutter bar assemblies each including a frame having cutter elements orbitally movable thereon, each of said cutter bar assemblies being secured to said rotating head for rotation therewith about said axis, said cutter bar assemblies extending in opposite directions from portions of said rotating head which are diametrically opposed to and radically offset from the axis of rotation, said cutter bar assemblies each being tilted in relation to the axis of rotation to cut the bore in a helical section and disposed substantially parallel to a tangent to the rotating head with the inner ends of the cutter bar assemblies terminating in overlapped relation, a first means for rotating said rotating means and cutter bar assemblies about said axis and a second means for orbitally driving said cutter elements about said cutter bar assemblies while crowding the cutter bar assemblies and supporting frame longitudinally of the bore.

10. The structure defined in claim 9 wherein each frame of said cutter bar assemblies include means disposed thereon for wedging off material resulting from a helical cut deeper than a kerf cut by the cutter bar assemblies.

11. The structure defined in claim 9 wherein said boring mechanism includes a quill shaft having the rotating head secured thereto and said second means includes a driving shaft extending within said quill shaft and said head, a driven means drivably connected to said driving shaft and having means mounted thereon for driving the respective orbitally movable cutter elements.

12. The structure defined in claim 11 wherein said driven means comprises a pair of driven shafts, one each axially aligned with the respective portion of the head and a rotatable cutter mounted on each driven shaft for cutting clearance for said cutter bar assemblies at the overlapped inner ends thereof.

13. The structure defined in claim 12 wherein said second means includes a winch on said supporting frame and a flexible strand anchored to a fixed point and wound upon the winch.

References Cited in the file of this patent

UNITED STATES PATENTS

| 556,985 | Hurd | Mar. 24, 1896 |
| 1,079,353 | Kuhn | Nov. 25, 1913 |
| 1,644,943 | Osgood | Oct. 11, 1927 |
| 1,699,936 | Watchhorn | Jan. 22, 1929 |
| 1,823,446 | Hansen | Sept. 15, 1931 |

FOREIGN PATENTS

| 1,059,859 | France | Nov. 18, 1953 |